US009694768B2

(12) United States Patent
Wojcik et al.

(10) Patent No.: US 9,694,768 B2
(45) Date of Patent: Jul. 4, 2017

(54) VEHICLE SAFETY POWER MANAGEMENT

(71) Applicant: Ford Global Technologies, LLC, Dearborn, MI (US)

(72) Inventors: Karl William Wojcik, Sterling Heights, MI (US); James Michael Weinfurther, Farmington, MI (US); David James Tippy, Ann Arbor, MI (US); Anthony Dwayne Cooprider, Rochester Hills, MI (US); Aaron Acuna, Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/731,098

(22) Filed: Jun. 4, 2015

(65) Prior Publication Data
US 2016/0311385 A1    Oct. 27, 2016

Related U.S. Application Data

(63) Continuation-in-part of application No. 14/696,759, filed on Apr. 27, 2015.

(51) Int. Cl.
*B60R 16/03* (2006.01)

(52) U.S. Cl.
CPC .................. *B60R 16/03* (2013.01)

(58) Field of Classification Search
CPC ....................................... B60R 16/03
USPC ............................................ 701/36
See application file for complete search history.

(56) References Cited

U.S. PATENT DOCUMENTS

| 4,917,443 | A | 4/1990 | Kramer et al. |
| 6,223,852 | B1 * | 5/2001 | Mukai ................ B62D 5/0463 180/443 |
| 6,640,174 | B2 | 10/2003 | Schondorf et al. |
| 7,635,043 | B2 | 12/2009 | Breed |
| 7,908,050 | B2 * | 3/2011 | Koie ...................... G01C 21/36 340/425.5 |
| 2002/0103590 | A1 | 8/2002 | Schondorf et al. |
| 2002/0116103 | A1 | 8/2002 | Matsunaga et al. |
| 2006/0214506 | A1 | 9/2006 | Albright et al. |
| 2007/0052291 | A1 | 3/2007 | Eberling et al. |
| 2007/0276584 | A1 | 11/2007 | Veliu et al. |

(Continued)

FOREIGN PATENT DOCUMENTS

| CN | 201472275 U | 5/2010 |
| CN | 102050028 A | 5/2011 |

(Continued)

OTHER PUBLICATIONS

Yahoo Answers, What's a Data Direction Register?, 2010, Yahoo! Answers <https://answers.yahoo.com/question/index?qid=20101122135840AAFM2qr>.*

(Continued)

*Primary Examiner* — Mussa A Shaawat
*Assistant Examiner* — Nadeem Odeh
(74) *Attorney, Agent, or Firm* — Frank A. MacKenzie; Bejin Bieneman PLC

(57) ABSTRACT

A vehicle system with a processing device programmed to determine an ignition state and determine a vehicle speed and then send a control signal to enable power for at least one vehicle subsystem if the ignition state is off and the vehicle speed is above a predetermined threshold.

9 Claims, 6 Drawing Sheets

(56) References Cited

U.S. PATENT DOCUMENTS

| | | |
|---|---|---|
| 2008/0258253 A1 | 10/2008 | Fey et al. |
| 2011/0040450 A1* | 2/2011 | Izutani ................. B62D 5/0481 701/43 |
| 2012/0235613 A1 | 9/2012 | Huang |
| 2014/0350788 A1* | 11/2014 | Byun ................... B62D 5/0481 701/41 |

FOREIGN PATENT DOCUMENTS

| | | | |
|---|---|---|---|
| CN | 102490670 A | 6/2012 | |
| CN | 202641573 U | 1/2013 | |
| CN | 203496695 U | 3/2014 | |
| DE | 2006013381 A1 | 9/2007 | |
| DE | 102006013381 A1 * | 9/2007 | ............. B60R 21/01 |
| JP | 2010172155 A | 8/2010 | |
| JP | EP 2685378 A1 * | 1/2014 | ............. B60R 16/03 |
| WO | WO 2014008741 A1 | 1/2014 | |

OTHER PUBLICATIONS

Machine Translation of DE 102006013381 A1.*
Non-Final Office Action dated Jun. 30, 2016; U.S. Appl. No. 14/696,659, filed Apr. 27, 2015; 17 pages.

* cited by examiner

VEHICLE SAFETY POWER MANAGEMENT

CROSS-REFERENCE TO RELATED APPLICATIONS

This patent application is a continuation-in-part of and claims priority to U.S. patent application Ser. No. 14/696,759 which was filed on Apr. 27, 2015, which application is incorporated herein by reference in its entirety.

BACKGROUND

Vehicle subsystems are often powered when the vehicle ignition is turned on. Some subsystems, such as interior lights, can turn on even if the vehicle is otherwise powered off. Interior lights, for instance, may turn on when one of the doors is opened. Other subsystems, like an entertainment system, may remain on for a brief time after the vehicle ignition is turned off.

DETAILED DESCRIPTION

This description makes reference to the Figures, wherein like numerals indicate like parts throughout the several views. The elements shown may take many different forms and include multiple and/or alternate components and facilities. The example components illustrated are not intended to be limiting. Indeed, additional or alternative components and/or implementations may be used.

Turning off the vehicle ignition is often assumed to be purposeful—that is, that the driver intends to turn off the vehicle subsystems and exit the vehicle. If the ignition system fails or is otherwise turned off inadvertently while the vehicle is moving, some subsystems and their corresponding functionality may be inadvertently disabled as a consequence. One way to prevent certain subsystems from turning off following an ignition system failure while the vehicle is moving includes a processing device programmed to determine an ignition state and a vehicle speed. The processing device powers at least one vehicle subsystem if the ignition state is off and the vehicle speed is above a predetermined threshold. The processing device may disable the vehicle subsystem when the vehicle speed falls below the predetermined threshold.

Figure 1:
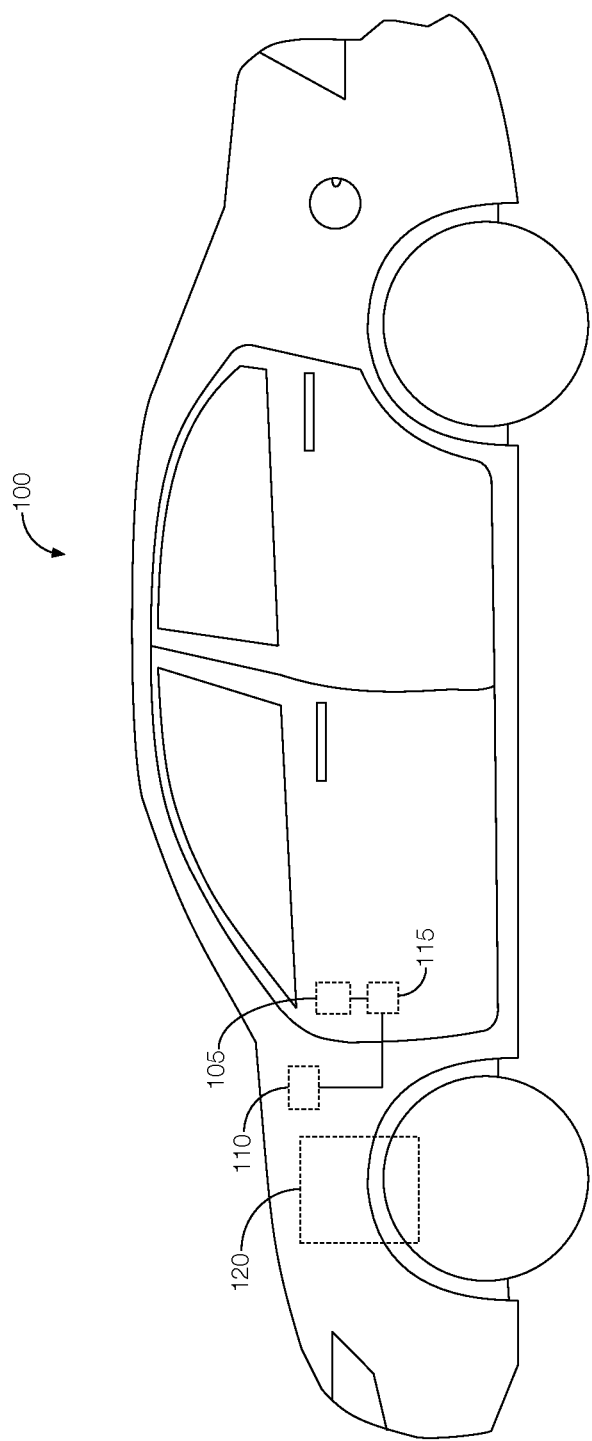
FIG. 1 illustrates an example vehicle implementing a power management module for providing power to certain vehicle subsystems under certain circumstances.

As illustrated in FIG. 1, the host vehicle 100 includes an ignition system 105, a battery 110, and a power management module 115. Although illustrated as a sedan, the host vehicle 100 may include any passenger or commercial automobile such as a car, a truck, a sport utility vehicle, a crossover vehicle, a van, a minivan, a taxi, a bus, motorcycles etc. In some possible approaches, the host vehicle 100 is an autonomous vehicle configured to operate in an autonomous (e.g., driverless) mode, a partially autonomous mode, and/or a non-autonomous mode.

The ignition system 105 may include an ignition slot located in the passenger compartment of the host vehicle 100. The ignition slot may be configured to receive a key. The key may be used to place the ignition system 105 into a number of different states, as discussed in greater detail below. The host vehicle 100 may operate in accordance with the ignition state. Alternatively or in addition, the ignition state could also be determined in accordance with a keyless entry system or keyless start system, sometimes referred to as a passive entry/passive start system or simply a passive start system.

The battery 110 may include any number of devices configured to provide electrical energy to one or more vehicle subsystems. Through chemical reactions, the battery 110 may generate an electric charge. The chemical reactions may occur in a number of cells arranged in series or parallel. Electrically conductive leads may be located on the battery housing. The electrical energy may be provided to vehicle subsystems connected, either directly or indirectly, to the leads. The battery power may be selectively provided to certain vehicle subsystems, as discussed in greater detail below.

The power management module 115 may include any computing device having a processing device 125 programmed to determine an ignition state and vehicle speed. The ignition state may be determined from a key state, e.g., a position of a key in an ignition slot. Example key states, and therefore ignition states, may include a RUN state, a ACC state, a Run_Start state and an OFF state. The RUN state may indicate the driver's intent for the vehicle engine and all vehicle subsystems to turn on. The ACC state may indicate the driver's desire for certain vehicle subsystems (e.g., accessories) to turn on but for the vehicle engine to remain off. The OFF state may indicate the driver's desire for the engine and most or all vehicle subsystems to turn off.

The power management module 115 may be programmed to determine or track historical key states. That is, the power management module 115 may determine a current key state based on the present position of the key in the ignition slot and a previous key state based on a previous position of the key in the ignition slot. By way of example, the current key state may be the RUN state and the previous key state may be the OFF or ACC state. Another example may have the current key state include the OFF state and the previous key state the RUN or ACC state.

In some instances, the key state may not accurately reflect the ignition state. For instance, the key state may be RUN (i.e., a key is in the ignition slot in the RUN position) but the ignition may be off. Therefore, the power management module 115 may be programmed to determine the ignition state independently of the key state, and vice versa.

Some vehicle subsystems, such as the interior and exterior lights, entertainment system, etc., may remain on for a limited period of time even though the ignition state is OFF. The vehicle speed may be determined from, e.g., a controller such as a powertrain controller, Antilock Brake System (ABS) or other module/sensor (see FIG. 2). The power management module 115 may selectively provide power from the battery 110 to one or more vehicle subsystems based on the inferred ignition state and the vehicle speed.

For instance, if the ignition state is OFF but the host vehicle 100 is still moving (e.g., the vehicle speed is above a predetermined threshold), the power management module 115 may continue to power certain vehicle subsystems, as described in greater detail below. Once the vehicle speed has dropped below the predetermined threshold, however, the power management module 115 may be programmed to disable one or more of the vehicle subsystems that have remained on. Disabling the vehicle subsystems may include, e.g., disconnecting those vehicle subsystems from the battery 110 to remove power. If the ignition turns on again before the speed has dropped the predetermined threshold, or if the speed is only below the predetermined threshold for a brief period of time, the power management module 115 may continue to power the vehicle subsystems as if the ignition had never turned off.

The power management module 115 may be programmed to implement a situational override. The situational override may be implemented, e.g., in response to a user input or a situation detected from sensor signals. Example situational overrides may include a parked vehicle override, a towing override, an assembly mode override, and a remote start override. The situational override may change the operation of the power management module 115. For instance, the situational override may cause the power management module 115 to allow certain or all subsystems to turn off under certain circumstances. Under normal operation, the power management module 115 may power vehicle subsystems if the ignition is inadvertently or unexpectedly turned off. With the situational overrides, the power management module 115 may permit or cause one or more vehicle subsystems to power down despite the key state and ignition state.

The parked vehicle override may be implemented when the host vehicle 100 is parked and the ignition is off. If the host vehicle 100 starts to roll, the power management module 115 may be programmed to not power any vehicle subsystems.

The towing override may be implemented when the host vehicle 100 is being towed. If a first towing override mode, which may occur when the ignition is off, no passengers are present in the host vehicle 100, and the host vehicle 100 is being towed, the power management module 115 may be programmed not to power any vehicle subsystems. A second towing override mode may occur when a passenger is present and the host vehicle 100 is being towed. One way to detect a passenger may include receiving a user input via a user interface device or by having the user turn the ignition to the RUN state or by an occupant detection sensor. Because a passenger is in the host vehicle 100, the power management module 115 may power certain subsystems such as a restraint system, an airbag system, etc.

The assembly mode override may be implemented when the host vehicle 100 is moving as part of a manufacturing or repair process. Therefore, the power management module 115 may be programmed to not power any vehicle subsystems when the host vehicle 100 is going through a manufacturing or repair process that would cause the host vehicle 100 to move while the ignition is off.

The remote start override may be implemented when the host vehicle 100 has been remote started. A remote start may occur when the engine is started from a remote transmitter and without anyone in the host vehicle 100 or a key in the ignition. When the remote start override is implemented, the power management module 115 may limit some vehicle subsystems such as a collision detection subsystem. Moreover, the power management module 115 may be programmed to disable the fuel pump after detecting a collision while the host vehicle 100 is in the remote start mode.

The power management module 115 may be further programmed to operate in a diagnostic mode. When in the diagnostic mode, the power management module 115 may provide diagnostic information to one or more vehicle subsystems. The diagnostic information may be detected at boot time and may be based on shutdown information from the prior key cycle. In other words, the diagnostic information for a particular key cycle may become available at the next key cycle. The power management module 115 functionality may be detected at the shutdown of the power cycle so the diagnostic information may be reported at the next ignition cycle. If no power is available when requested, however, the diagnostic information may be made available during the current ignition cycle. The power management module 115 may store some number of extended mode states for retrieval at a later time.

In the diagnostic mode, the power management module 115 may provide diagnostic information to, e.g., the restraint control module 160. The Pass Thru path may be evaluated before the power management module 115 activates power to the restraint control module 160, occupant classification system 165, or passenger airbag disable indicator 170, making diagnostic information available to the restraint control module 160 during the current key cycle. However, since the power management module 115 powered path may be evaluated after the ignition state changes to OFF, this diagnostic information to the restraint control module 160 may be delayed until the next key cycle. Fault reporting to the restraint control module 160 may be carried out as follows. A CAN signal, indicating whether the power management module 115 has detected a fault on inputs, outputs, or pass through, may be transmitted. A CAN signal may be published even though the restraint control module 160 may not be able to receive signals (e.g., the restraint control module 160 has no power or has otherwise failed). The CAN signal from the power management module 115 may include a fault for, e.g., the restraint control module 160 to handle. The restraint control module 160 may communicate system fault info to the cluster via CAN signals (e.g., the airbag light). If the signal from the restraint control module 160 to the cluster is missing, the cluster may turn on the airbag light.

Figure 2:
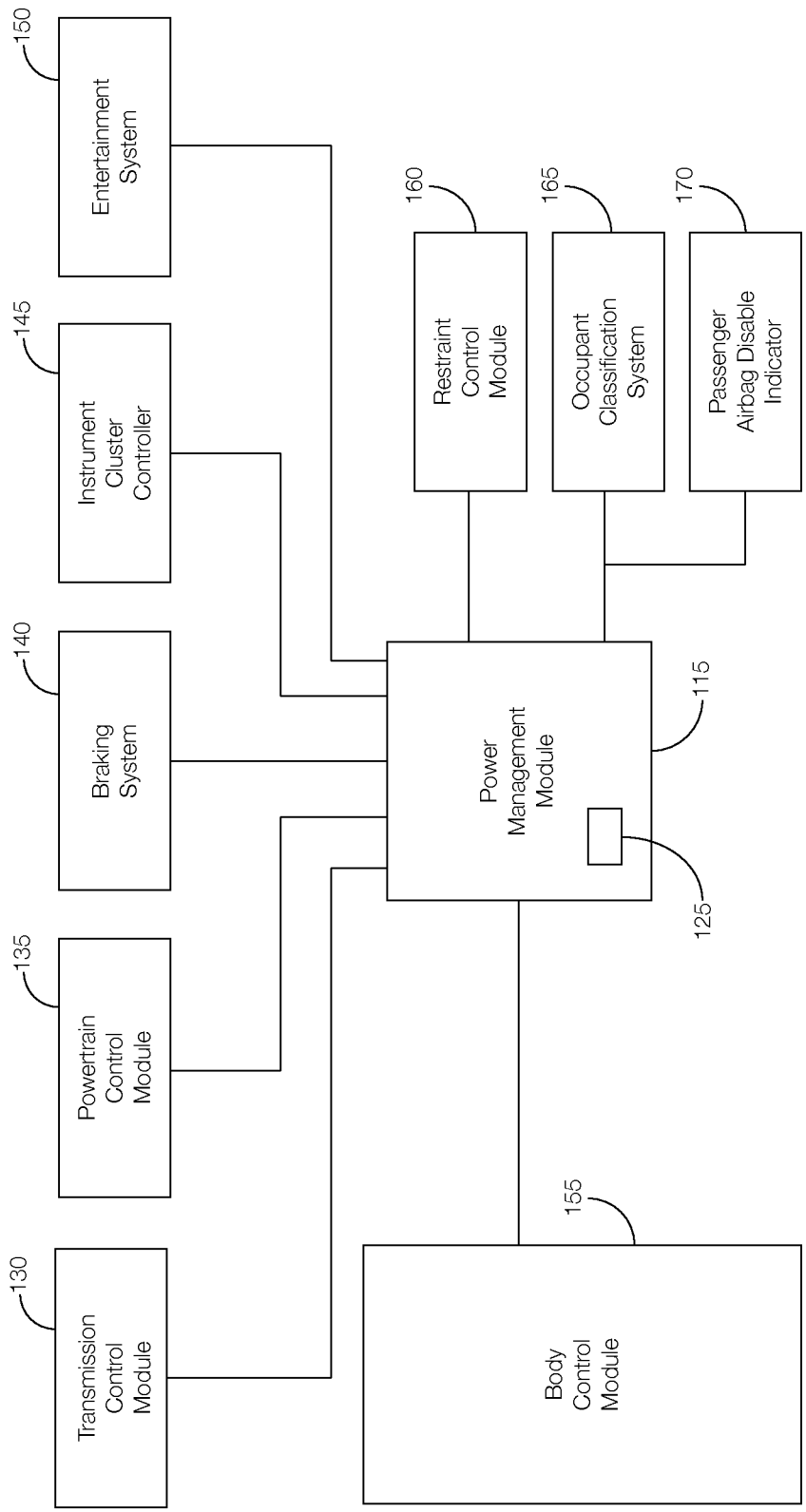
FIG. 2 is a block diagram of an example power management module and vehicle subsystems.
Figure 3:
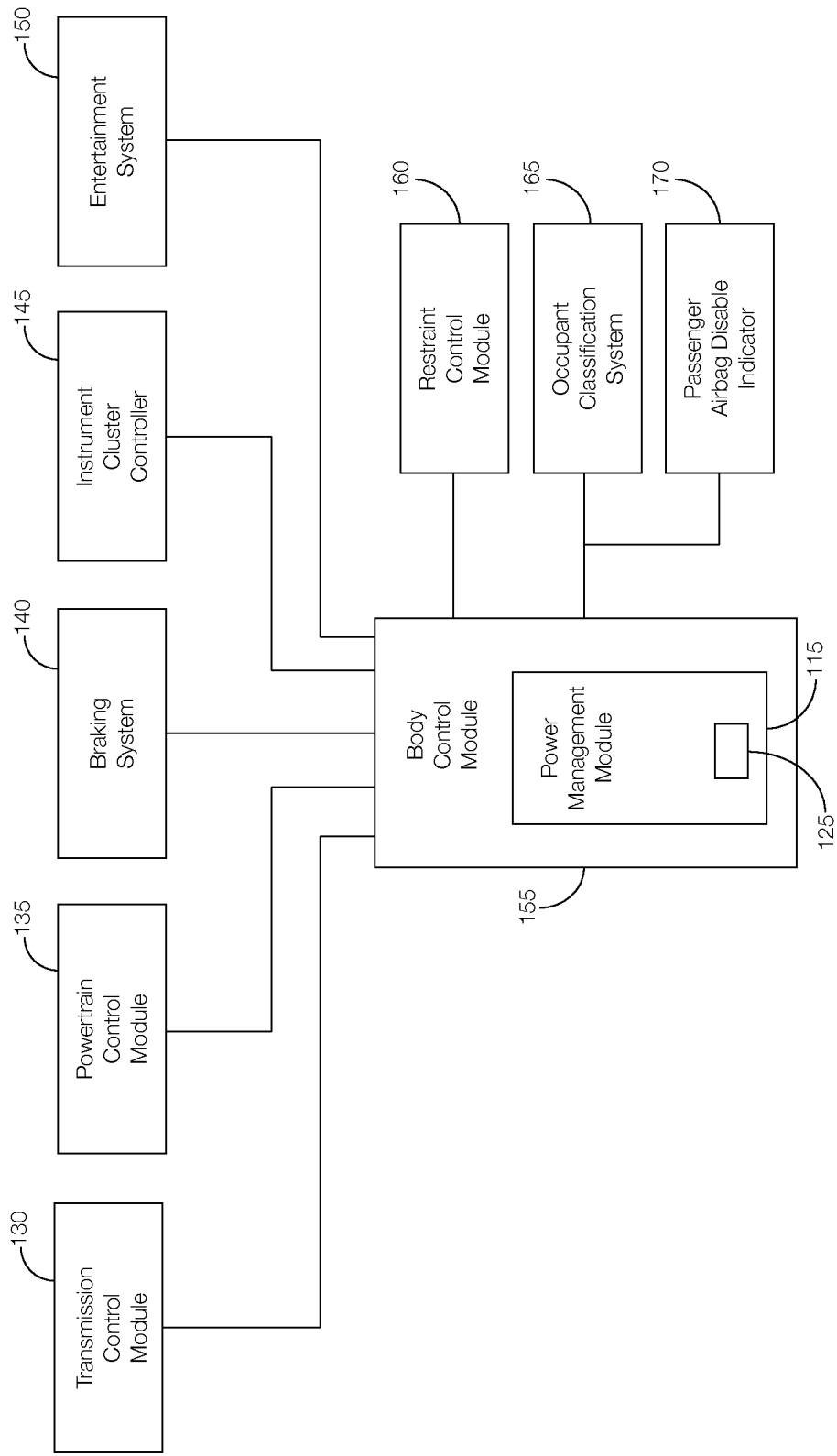
FIG. 3 is a block diagram of the power management module incorporated into a body control module.

Referring generally to FIGS. 2 and 3, the lines connecting the components may represent a transfer of information, power, or both. FIG. 2 is a block diagram of an example power management module 115 and vehicle subsystems. The vehicle subsystems shown include a transmission control module 130, a powertrain control module 135, a brake system 140, a cluster controller 145, an entertainment system 150, a body control module 155, a restraint control module 160, an occupant classification system 165, and a passenger airbag disable indicator 170. Other subsystems, not shown, may be further incorporated into the host vehicle 100 and work in accordance with the power management module 115. Examples of other potential subsystems may include, e.g., a power steering subsystem, a power door and window subsystem, etc. The power management module 115 may further include a processing device 125, as discussed above with regard to FIG. 1.

The transmission control module 130 may include any computing device programmed to control operation of the vehicle transmission. The powertrain control module 135 may include any computing device programmed to control operation of one or more vehicle powertrain components. The brake system 140 may include any computing device programmed to control operation of the vehicle brakes. The cluster controller 145 may include any computing device programmed to control the operation of the components of the instrument cluster. The entertainment system 150 may include any computing device and user interface device programmed to, e.g., provide media content to vehicle occupants. The body control module 155 may include any computing device programmed to control the operation of the vehicle battery 110. The restraint control module 160 may include any computing device programmed to control operation of the vehicle restraint system, including seatbelts and airbags. The occupant classification system 165 may include any computing device and sensors programmed to detect and possibly identify one or more vehicle occupants. The passenger airbag disable indicator 170 may include a visual alert that, e.g., illuminates to indicate whether a passenger airbag is turned off.

The processing device 125 may receive as inputs the ignition state and vehicle speed, as discussed above. The processing device 125 may be programmed to power one or more of the vehicle subsystems if the ignition state is off and the vehicle speed is above a predetermined threshold. For instance, the processing device 125 may determine the ignition state from the key state. Alternatively, the power management module 115 may be programmed to determine the ignition state independently of the key state, and vice versa, to accommodate instances where, e.g., the key state does not accurately reflect the operating state of the ignition. As shown in FIG. 2, the processing device 125 may be programmed to command the body control module 155 to provide power to the restraint control module 160, the occupant classification system 165, the passenger airbag disable indicator 170, as well as other vehicle subsystems while the vehicle speed is above the predetermined threshold. If the vehicle speed drops below the predetermined threshold, the processing device 125 may be programmed to disable one or more of these vehicle subsystems. Disabling the vehicle subsystems may include, e.g. commanding the body control module 155 to remove power from one or more of the vehicle subsystems.

FIG. 3 is a block diagram of the power management module 115 incorporated into a body control module 155. In this example implementation, the power management module 115 operates as a "mode" as opposed to a separate computing device relative to the body control module 155. The power management module 115 may be alternatively or additionally incorporated into any number of other vehicle subsystems or control modules.

Figure 4:
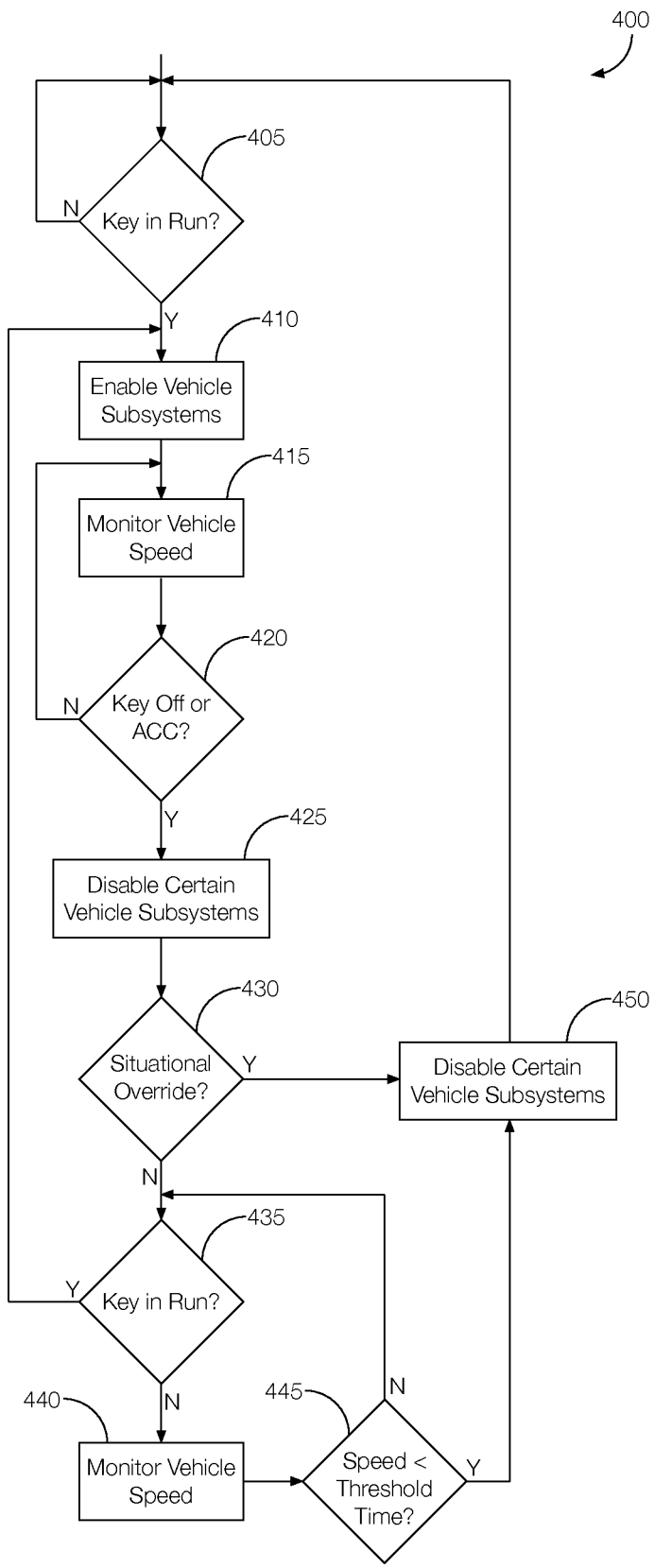
FIG. 4 is a flowchart of an example process that may be executed by the power management module to provide power to certain vehicle subsystems under certain circumstances.

FIG. 4 is a flowchart of an example process 400 that may be executed by the power management module 115 to provide power to certain vehicle subsystems under certain circumstances. The process 400 may be initiated when a vehicle is turned on and may continue to execute until the vehicle is turned off and, e.g., the key is removed from the ignition slot.

At decision block 405, the power management module 115 may determine an ignition state of the vehicle. For example, the processing device 125 may determine whether the key is in the RUN position in the ignition. If so, the process 400 may proceed to block 410. Otherwise, the process 400 may continue to execute block 405 until the ignition state is RUN.

At block 410, the power management module 115 may enable one or more vehicle subsystems to operate. Enabling the vehicle subsystems may include powering at least one of the vehicle subsystems by, e.g., selectively connecting one or more of the vehicle subsystems to power from the battery 110.

At block 415, the power management module 115 may begin to monitor vehicle speed. The processing device 125 may determine the vehicle speed based on, e.g., signals output by a controller such as a powertrain controller.

At decision block 420, the power management module 115 may reassess the ignition state of the vehicle. Specifically, the processing device 125 may determine whether the key is in the OFF or ACC position. If so, the process 400 may proceed to decision block 420. Otherwise, the process 400 may return to block 415.

At block 425, the power management module 115 may disable or otherwise allow one or more vehicle subsystems to turn off. That is, the power management module 115, through the processing device 125, may selectively remove power to one or more of the vehicle subsystems.

At decision block 430, the power management module 115 may determine whether any situational overrides exist. The situational override may be implemented, e.g., in response to a user input or a situation detected from sensor signals. Example situational overrides may include a parked vehicle override, a towing override, an assembly mode override, and a remote start override. Different situational overrides may be initiated in response to different criteria or circumstances, as discussed above. Further, different towing overrides may apply based on, e.g., whether anyone is present in the host vehicle 100. Thus, assuming all other criteria for implementing a towing override exist, a first towing override, discussed above, may be implemented if an occupant is present in the host vehicle 100 while a second towing override, discussed above, may be implemented if no occupants are present in the host vehicle 100. If a situational override exists, the process 400 may proceed to block 450. If no situational overrides exist the process 400 may proceed to block 435.

At decision block 435, the power management module 115 may reevaluate the ignition state of the vehicle. For example, the processing device 125 may determine whether the key is in the RUN position in the ignition. If so, the process 400 may return to block 410. Otherwise, the process 400 may continue to block 440.

At block 440, the power management module 115 may begin to monitor vehicle speed. The processing device 125 may determine the vehicle speed based on, e.g., signals output by a controller such as a powertrain controller. The process 400 may proceed to decision block 445.

At decision block 445, the power management module 115 may determine whether the monitored vehicle speed is below a predetermined threshold for a predetermined amount of time. For instance, the processing device 125 may compare the present vehicle speed to the predetermined threshold, and determine whether the host vehicle 100 is travelling at a speed less than the predetermined threshold for more than a predetermined amount of time (e.g., 0.5 seconds). If the host vehicle 100 has been travelling below the predetermined threshold for more than a predetermined amount of time, the process 400 may proceed to block 450. If the host vehicle 100 has been travelling below the predetermined threshold for less than the predetermined amount of time, the process 400 may proceed to block 435.

At block 450, the power management module 115 may disable or otherwise allow one or more vehicle subsystems to turn off. That is, the power management module 115, through the processing device 125, may selectively remove power to one or more of the vehicle subsystems, including any one or more vehicle subsystems left on after block 425.

Figure 5:
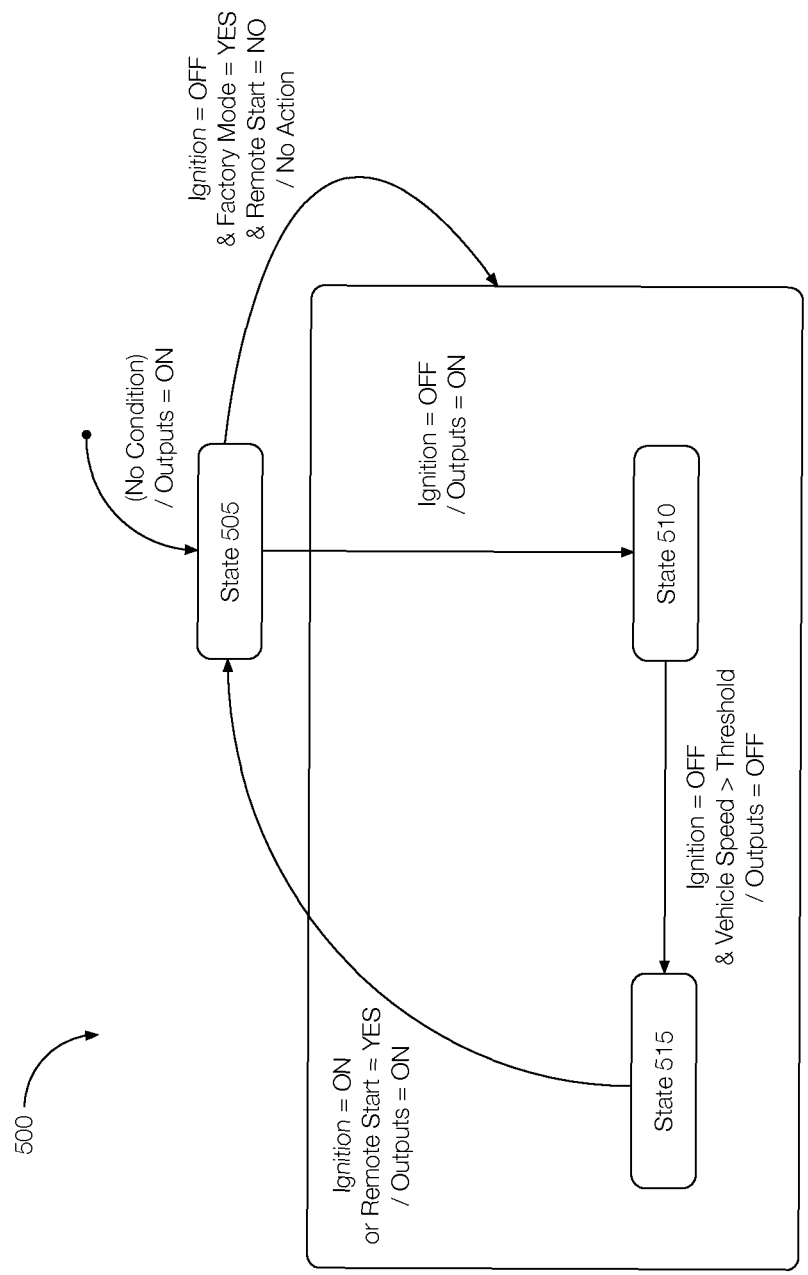
FIG. 5 is an example finite state machine showing possible states of the power management module.

FIG. 5 is an example finite state machine 500 showing possible states of the power management module 115. The finite state machine may be implemented by, e.g., the processing device 125. At state 505, the processing device 125 may be programmed to output an ON signal that causes the battery 110 to provide power to one or more vehicle subsystems. State 510 may be initiated in response to the ignition state switching to the OFF position, assuming no situational overrides have been initiated. At state 510, the processing device 125 may continue to output the ON signal. State 515 may be initiated from state 510 so long as the ignition remains off and the vehicle speed drops below the predetermined threshold, and in some instances as discussed above, drops below the predetermined threshold for a predetermined amount of time (e.g., 0.5 seconds). At state 515, the output of the processing device 125 may switch to an OFF signal that, e.g., removes battery power from one or more vehicle subsystems. The processing device 125 may return to state 505 from state 515 if, e.g., the ignition turns on or one of the situational overrides, such as the remote start override, is triggered. When the processing device 125 transitions to state 505, the output of the processing device 125 may switch from the OFF signal to the ON signal.

Figure 6:
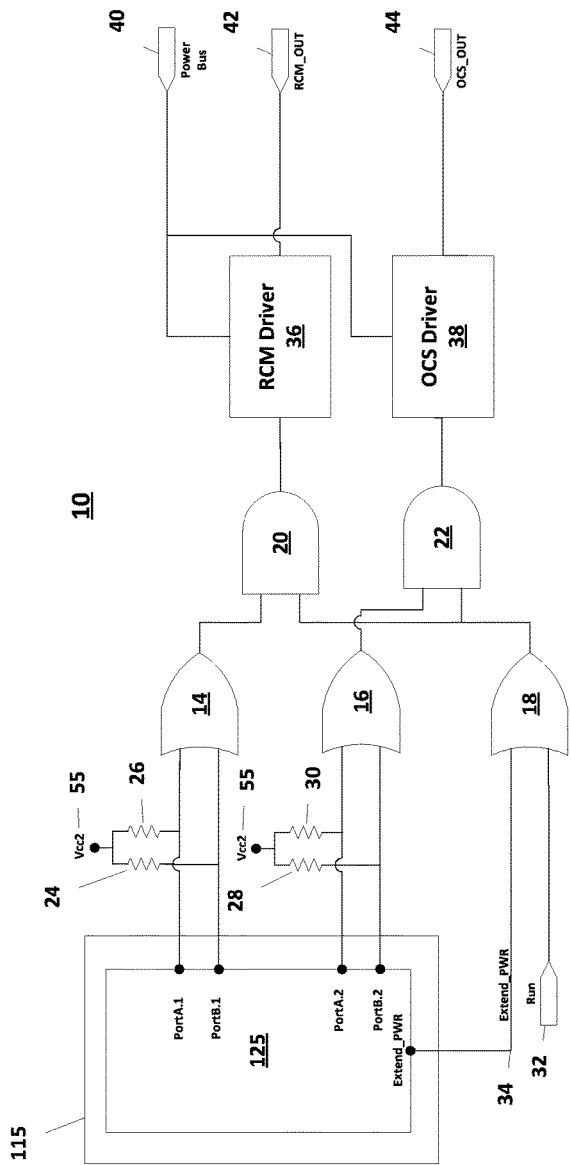
FIG. 6 is a schematic diagram of an exemplary redundant power logic circuit of the power management module.

If the processing device 125 of the power management module 115 were to falter, halt and/or lock up when executing the processes of the power management module 115, a loss of power to the restraint control module 160 and the occupant classification system 165 can occur. To prevent the loss of power to these modules, an exemplary redundant power logic circuit 10 of FIG. 6 can be implemented. A first set of output ports of the processing device 125 are communicatively coupled to a first OR gate 14 along with two pull-up resistors 24 and 26, which are communicatively coupled to a Vcc2 55 voltage source. The term "Vcc" in an electronic circuit is the name of the positive (plus) voltage when using intergraded circuits in an electronic design.

The Vcc2 55 voltage is provided by a semi regulated redundant power supply 50 and is described below. A second set of output ports of the processing device 125 are communicatively coupled to a second OR gate 16 along with two pull-up resistors 28 and 30, which are communicatively coupled to Vcc2 55 voltage. The pull-up resistors 24, 26, 28, 30 ensure that the inputs of the OR gates 14 and 16 are pulled high (a logical 1) in the event that the processing device 125 output ports inadvertently go into a tri-state mode (e.g. when the processing device goes in reset). The ports of logic devices, such as the processing device 125 can assume a high impedance state in addition to the 0 and 1 logic levels, effectively removing their output from the circuit. When the outputs are in the tri-state mode, their influence on the rest of the circuit is removed, and the circuit node will be "floating" between the 0 and 1 logic levels if no other circuit element determines its state. If the inputs to the OR gates 14 and 16 are "floating," the output of the OR gates 14 and 16 will be unstable and be in an undetermined state. As discussed above, the pull-up resistors 24, 26, 28, 30 ensure that the inputs of the OR gates 14 and 16 are pulled high (a logical 1) in the event that the processing device 125 output ports inadvertently go into a tri-state mode.

A Run signal 32 is an active high control signal when the host vehicle 100 is on and is communicatively coupled to a first input of a third OR gate 18. The processing device 125 generates an Extend_PWR 34 signal on an output port of the processing device 125 and is communicatively coupled to a second input of the third OR gate 18. The Extend_PWR 34 signal is an active high (a logical 1) signal and indicates that a determination has been made by the processing device 125 to keep power supplied to the restraint control module 160 and the occupant classification system 165, which will further discussed below.

An output of the OR gate 14 and an output of the OR gate 18 are communicatively coupled to inputs of a logic AND gate 20. An output of the logic OR gate 16 and an output of the logic OR gate 18 are communicatively coupled to inputs of a logic AND gate 22. An output of the logic AND gate 20 is communicatively coupled to a restraint control module (RCM) driver 36, and an output of the logic AND gate 22 is communicatively coupled to an occupant classification sensor (OCS) driver 38. A Power Bus 40 voltage source is connected to the RCM driver 36, and to the OCS driver 38. An output of the RCM driver 36 is a RCM voltage source 42, which is a power source for the restraint control module 160. An output of the OCS driver 38 is a OCS voltage source 44, which is a power source for the occupant classification system 165.

The RCM driver 36 and the OCS driver 38 should not be indefinitely turned ON or left ON in a shorted load condition. Therefore the processing device 125 monitors the output driver load status and can turn OFF the RCM driver 36 and the OCS driver 38. However, allowing the processing device 125 to turn OFF the drivers creates a failure mode where the processing unit 125 can inadvertently disable these outputs.

To prevent the failure mode, output ports A.1, B.1, A.2 and B.2 of the processing device 125 are first configured as inputs by setting the direction of an output port data direction register. Then the processing device 125 pre-loads port data registers with all logic highs (1). To turn off either the RCM driver 36 and the OCS driver 38, the processing unit 125 must then take overt steps. For example, to turn off the RCM driver 36, the processing unit 125 must overtly change port A.1's data direction register setting from an input to an output. Then the processing device 125 will change the port A.1 data register from a logic high (1) to a logic low (0). The processing device 125 then will change port B.1 data direction register from and input to an output and change the port B.1 data register from a logic high (1) to a logic low (0) causing the output of the OR GATE 14 to go to a logic low (0). Since the output of the OR gate 14 is an input to the AND gate 20, the output of the AND gate 20 will go to a logic low (0) or will remain at a logic low (0), turning off the RCM driver 36.

To turn off the OCS driver 38, the processing unit 125 must overtly change port A 2's data direction register setting from and input to an output. Then the processing device 125 will change the port A.2 data register from a logic high (1) to a logic low (0). The processing device 125 then will change port B.2 data direction register from an input to an output and change the port B.2 data register from a logic high (1) to a logic low (0) causing the output of the OR gate 16 to go to a logic 0. Since the output of the OR gate 16 is an input to the AND gate 22, the output of the AND gate 22 will go to a logic low (0) or will remain a logic low (0), turning off the OCS driver 38.

A first input of the OR Gate 18 is a Run signal 32. The Run signal 32 is provided by the host vehicle 100 when the host vehicle 100 is running. For example, when the host vehicle 100 is on, a high (a logical 1) is applied to an input of the OR gate 18. The output of the OR Gate 18 is then a high (a logical 1) and the second inputs to AND gates 20 and 22 are highs (a logical 1). The output of the AND gates 20 and 22 are highs (a logical 1) and the inputs to the RCM driver 36 and the OCS driver 38 are highs (a logical 1), enabling the RCM driver 36 and the OCS driver 38. With the RCM driver 36 and the OCS driver 38 enabled, a power bus voltage 40 is then permitted to flow through the RCM driver 36 and the OCS driver 38 to provide the power to the restraint control module 160 and the occupant classification system 165.

When the Run 32 signal is a low (a logical 0), an Extend_PWR 34 signal must be a high (a logical 1) to enable the RCM driver 36 and the OCS driver 38, although the Run 32 is a low (a logic 0), as described above. For example, the host vehicle 100 may be inadvertently turned off while the host vehicle 100 was moving faster than 4 KPH (kilometers per hour). The Run 32 signal would be a low (a logical 0), the processing device 125 would detect this situation and set the Extend_PWR 34 to a high (a logical 1), thus enabling the RCM driver 36 and the OCS driver 38 and further enable the restraint control module 160 and the occupant classification system 165.

Figure 7:
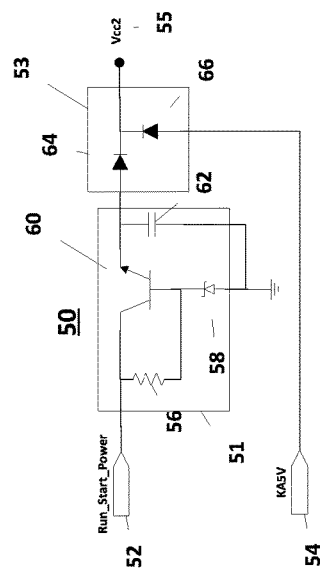
FIG. 7 is a schematic diagram of an exemplary semi-regulated redundant power source circuit.

Now with reference to FIG. 7, a semi regulated redundant power source 50 is shown. A Run_Start_Power (RSP) voltage 52 is a first source of electrical power to the power management module 115 and is enabled by the power management module 115 or another control module used to determine the Ignition state when the Run 32 is active. A second source of electrical power is a keep-alive five volt (KA5V) 54 voltage which is available when the power management module 115 is connected to the host vehicle 100 battery or electrical system, i.e., when the processing device 125 has a positive 12 voltage source and a corresponding ground.

A resistor 56, a transistor 60, a zener diode 58, and a capacitor 62 comprise a voltage regulator circuit 51 to regulate the RSP voltage 52. A diode 64 and a diode 66 form a diode OR gate 53, and will allow either the RSP voltage 52 or the KA5 V 54 to become the Vcc2 55 voltage. For example, if the host vehicle 100 were to be inadvertently switched off while the vehicle was moving, the RSP voltage 52 would not be present. However, KA5V 54 is still present and therefore, Vcc2 55 voltage will still be present and supplying power to the pull-up resistors 24-30. Other voltage regulator and or topologies may also be used.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, PHP, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a power management module comprising a processor having a data direction register (DDR) that includes a first port and a logic circuit coupled to the processor and at least one vehicle subsystem, wherein the first port is preset to an input direction, wherein the processor is programmed to:
determine an ignition state and a speed of a vehicle;
when the ignition state is OFF and the speed is above a predetermined threshold, provide power to the at least one vehicle subsystem via the logic circuit; and
when the ignition state is OFF and the speed is less than a predetermined threshold, then change the first port to an output direction to remove power from the at least one vehicle subsystem.

2. The vehicle system of claim 1, wherein the DDR includes a second port that is preset to an input direction, wherein the processor further is programmed to: when the ignition state is OFF and the speed is less than the predetermined threshold, then change the second port to an output direction, wherein power is removed from the at least one vehicle subsystem only when both the first and second ports are changed to the output direction.

3. The vehicle system of claim 1, wherein the logic circuit comprises a power regulation circuit that is configured to maintain power to the at least one vehicle subsystem when the ignition state is OFF.

4. The vehicle system of claim 1, wherein the logic circuit comprises at least one vehicle subsystem driver that facilitates providing power to the at least one vehicle subsystem when the at least one vehicle subsystem driver is enabled, wherein the logic circuit is configured to enable the at least one vehicle subsystem driver when the first port is in the input direction and when the processor provides an independent control signal indicating one of: the ignition state is ON, or the vehicle speed is greater than the predetermined threshold while the ignition state is OFF.

5. The vehicle system of claim 4, wherein the logic circuit comprises a power regulation circuit that switchably provides a first power or a second power to the at least one vehicle subsystem driver, wherein the first power is coupled to a primary vehicle power source, wherein the second power is provided to the at least one vehicle subsystem driver in the absence of the first power.

6. A method comprising:
determining, at a processor of a power management module in a vehicle, an ignition state of the vehicle, wherein the processor includes a data direction register (DDR) and is coupled to at least one vehicle subsystem;
determining, at the processor, a speed of the vehicle;
comparing, at the processor, the speed to a predetermined threshold;
when the ignition state is OFF and when the speed is above the predetermined threshold, then providing power to the at least one vehicle subsystem; and
when the ignition state is OFF and when the speed is less than the predetermined threshold, then changing a port of the DDR from an input direction to an output direction to remove power from the at least one vehicle subsystem.

7. The method of claim 6, wherein the DDR has a plurality of ports, and further comprising changing at least two of the plurality of ports from the input direction to the output direction to remove power from the at least one vehicle subsystem.

8. The method of claim 7, wherein the at least two of the plurality of ports are in the output direction at the same time.

9. The method of claim 6, wherein the power management module further comprises a logic circuit that includes a power regulation circuit that is configured to switchably provide a first power or a second power to the at least one vehicle subsystem when the port of the DDR is configured in the input direction, wherein the first power is coupled to a primary vehicle power source, wherein the second power is provided in the absence of the first power.

* * * * *